United States Patent [19]
Brocard et al.

[11] Patent Number: 5,284,020
[45] Date of Patent: Feb. 8, 1994

[54] FUEL SUPPLY SYSTEM FOR GAS TURBINE ENGINES

[75] Inventors: Jean-Marie Brocard, Rubelles; Pierre G. J. Hebert, Crosne; Thierry N. de Jongh, Bonneuil-Matours, all of France

[73] Assignee: Societe Nationale d'Etude et de Construction de Moteurs d'Aviation ("S.N.E.C.M.A."), Paris, France

[21] Appl. No.: 990,058

[22] Filed: Dec. 14, 1992

[30] Foreign Application Priority Data

Dec. 18, 1991 [FR] France ................ 91 15694

[51] Int. Cl.$^5$ ............................. F02C 7/228
[52] U.S. Cl. ......................... 60/739; 137/118
[58] Field of Search ............. 60/734, 739; 137/118, 137/119

[56] References Cited

U.S. PATENT DOCUMENTS

| | | | |
|---|---|---|---|
| 2,629,225 | 2/1953 | Ammann | 60/739 |
| 2,664,910 | 1/1954 | Boyd et al. | 137/118 |
| 3,158,998 | 12/1964 | Robinson et al. | 60/739 |
| 3,552,123 | 1/1971 | Anschultz, et al. | |
| 3,587,231 | 6/1971 | Fisher et al. | |
| 4,226,365 | 10/1980 | Norris et al. | 137/118 |
| 4,326,376 | 4/1982 | Stearns et al. | |
| 5,003,771 | 3/1991 | Kester et al. | |
| 5,096,157 | 3/1992 | Yasuda | |
| 5,109,664 | 5/1992 | Kester et al. | |

FOREIGN PATENT DOCUMENTS 1,425,375 12/1966 France .

*Primary Examiner*—Louis J. Casaregola
*Attorney, Agent, or Firm*—Bacon & Thomas

[57] ABSTRACT

A system for supplying fuel to a plurality of fuel injectors of a gas turbine engine is disclosed having first and second fuel distributors and a fuel transfer device which enables fuel to flow from the fuel source to the first and second fuel distributors as a function of the fuel flow rate. The fuel transfer device enables fuel to flow through the first fuel distributor under low fuel flow conditions. The first fuel distributor sequentially supplies fuel to each of a plurality of groups of fuel injectors when the fuel flow rate is below a predetermined threshold value. When the fuel flow exceeds a high threshold value, the fuel transfer device enables fuel to flow through the second fuel distributor which supplies fuel to all of the fuel injectors of the engine.

13 Claims, 3 Drawing Sheets

FUEL SUPPLY SYSTEM FOR GAS TURBINE ENGINES

BACKGROUND OF THE INVENTION

The present invention relates to a system for supplying fuel to a plurality of fuel injectors of a gas turbine engine. More particularly, the system is intended for use in gas turbine engines having aircraft applications.

At present, gas turbine engines in both civilian and military aircraft use incorporate fuel supply systems where the fuel to be consumed in the combustion chamber is supplied continuously by a simple fuel supply circuit. Fuel pumps feed the fuel to a fuel metering device and subsequently through a fuel distribution system which simultaneously supplies the metered fuel to all of the fuel injectors. The fuel metering device is suitably set by a drive means and the excess fuel is returned to the fuel pump intakes through a bypass flap valve, also set by the drive means. Since all of the injectors are supplied with fuel at low fuel flows, with low local richness in the combustion chamber, the combustion stability is difficult to achieve using these known systems.

U.S. Pat. Nos. 3,552,123 and 3,587,231 disclose sequential fuel control systems for jet engines in which a specified and predetermined number of fuel injectors are fed with fuel in a predetermined sequence. At low power outputs of the jet engine, the fuel distribution is not homogeneous.

U.S. Pat. No. 4,326,376 discloses a fuel supply system for a gas turbine engine in which fuel is supplied to the engine through three fuel flow regulating circuits in parallel between a common fuel intake aperture and a common fuel outlet aperture making it possible to simultaneously feed all of the fuel injectors.

SUMMARY OF THE INVENTION

A system for supplying fuel to a plurality of fuel injectors of a gas turbine engine is disclosed having first and second fuel distributors and a fuel transfer device which enables fuel to flow from the fuel source to the first and second fuel distributors as a function of the fuel flow rate.

The fuel transfer device enables fuel to flow through the first fuel distributor under low fuel flow conditions. The first fuel distributor sequentially supplies fuel to each of a plurality of groups of fuel injectors when the fuel flow rate is below a predetermined threshold value.

When the fuel flow exceeds a high threshold value, the fuel transfer device enables fuel to flow through the second fuel distributor which supplies fuel to all of the fuel injectors of the engine.

The fuel supply system according to this invention improves the homogeneity of the average fuel distribution between all of the fuel injectors, improves the combustion stability, and reduces the amount of unburned material due to local enrichment, while at the same time preserving the average richness of the fuel/air mixture. The system also increases the accuracy of the fuel distribution when the fuel flow (the quantity or volume per unit time) is low.

The first fuel distributor distributes fuel to groups of fuel injectors in a cyclic and sequential manner such that the resulting flow from the fuel source is substantially constant. In order to enhance flame propagation during the cycle of the first fuel distributor, it simultaneously supplies fuel to two groups of fuel injectors such that the fuel flow rate variations between the two groups will balance each other.

The first fuel distributor may comprise a generally cylindrical casing having a generally cylindrical feed slide valve sealingly located therein such that the slide valve may be rotated by a drive means relative to the casing. The casing defines a plurality of axially elongated slits circumferentially spaced apart around the casing, which slits are connected via conduits to the fuel injectors. The slide valve defines at least one aperture, which may have a generally bell-shaped configuration such that it angularly extends over a sector of the slide valve corresponding to twice the space between the slits.

The function of the second fuel distributor is achieved by slidably mounting the slide valve within the casing such that it may also axially move along its rotational axis. The axial movement of the slide valve is achieved by the fuel transfer device, such axial movement being a function of the fuel flow rate or pressure within the casing. As the fuel flow into the casing increases, the slide valve moves axially away from a first position toward a second position in which the slide valve uncovers all of the slits in the casing, thereby allowing the fuel to be simultaneously supplied to all of the plurality of fuel injectors. The fuel transfer device may comprise one or more resilient springs interposed between the casing and the slide valve to bias it toward its first position. The increasing fuel pressure within the casing overcomes this spring biasing force to move the slide valve axially toward its second position.

DETAILED DESCRIPTION OF THE PREFERRED EMBODIMENT

Figure 1:
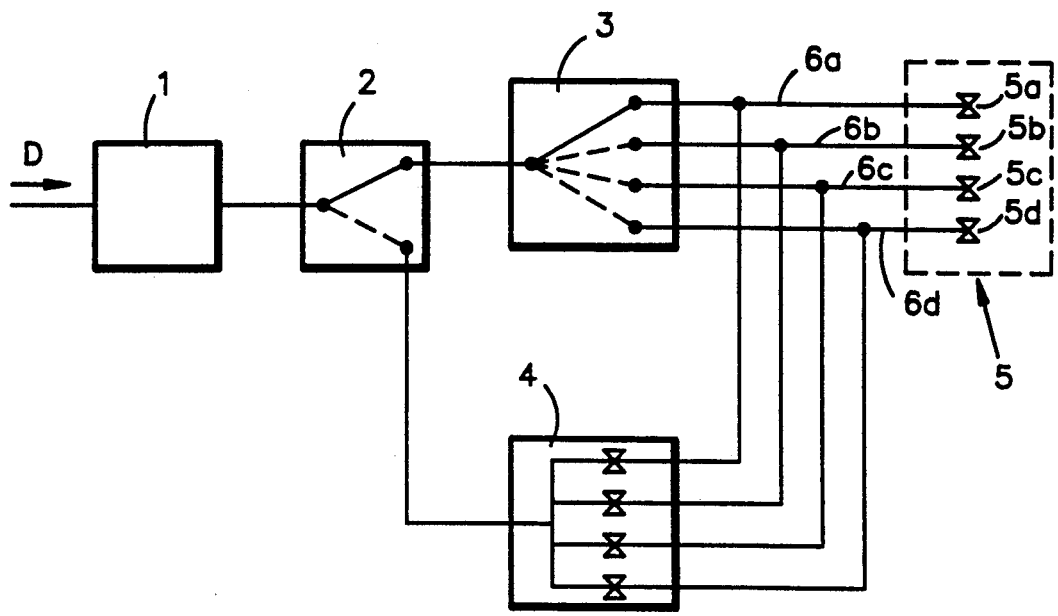
FIG. 1 is a functional block diagram of the fuel supply system according to the present invention.

FIG. 1 shows a functional block diagram of the fuel supply system according to the present invention. The fuel flow D from one or more fuel pumps (not shown) passes through a known fuel metering device 1 before the progressive transfer device 2 directs the fuel toward a first fuel distribution means 3 when the flow of consumed fuel is low and toward a second fuel distribution means 4 when the fuel flow is high. The second fuel distribution means 4 uniformly feeds the totality of fuel to all of the fuel injectors 5. The first fuel distribution means 3 feeds fuel only to some of the fuel injectors 5 at any given time. However, it is designed such that all of the fuel injectors 5 are supplied fuel cyclically and sequentially during each cycle.

The gas turbine engine fuel injectors 5 are divided into groups 5a, 5b, 5c and 5d such that all of the injectors of a given group are fed fuel in the same fashion. Although the invention will be described in conjunction with four such fuel injector groups (5a-5d) it is to be understood that the number of groups of fuel injectors may vary according to each particular application. The groups of fuel injectors 5a-5d are supplied from fuel injection manifolds 6a, 6b, 6c and 6d, respectively, connected to the first and second fuel distribution means 3 and 4.

The progressive fuel transfer device 2 serves to distribute the fuel flow D between the first and second fuel distribution means 3 and 4 as a function of the fuel flow D. The system may pass from low-flow to high-flow operation without interrupting the fuel flow in the injection manifolds 6a-6d.

The first fuel distribution means 3 simultaneously supplies two groups of fuel injectors (such as 5a and 5b) under low fuel flow conditions such that flame propagation within the combustion chamber of the engine is assured by overlapping fuel flow on two adjacent injection manifolds.

Figure 2:
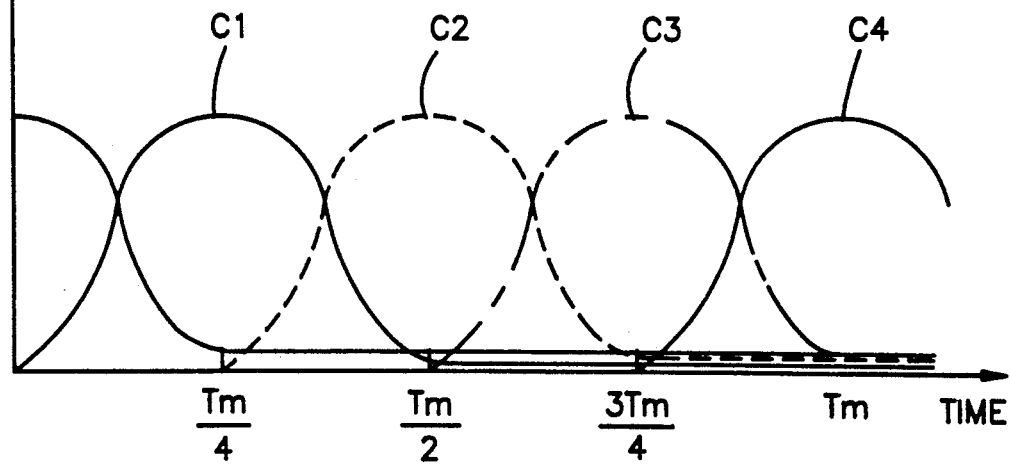
FIG. 2 is a fuel flow vs. time graph for each of the fuel injector groups.

FIG. 2 illustrates curves C1, C2, C3 and C4 of the fuel flow in each group of injectors 5a-5d, respectively, during an operational cycle of the first fuel distribution means 3. The period of the cycle is denoted by $T_m$ and, as can be seen, each curve C1-C4 assumes a Gaussian or half-sinusoidal curve over half the period $T_m$. The curves are such that the total fuel flow from the source of fuel, or the metering device 1 is substantially constant. Thus, the variations of flows in the simultaneously fed injector groups balance themselves. This minimizes the pressure pulses near the fuel source or the metering device 1.

Figure 3:
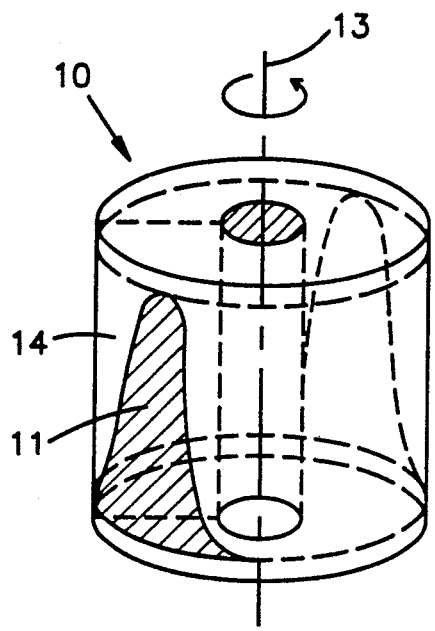
FIG. 3 is a perspective view of the rotary slide valve used in the fuel supply system according to the present invention.
Figure 4:
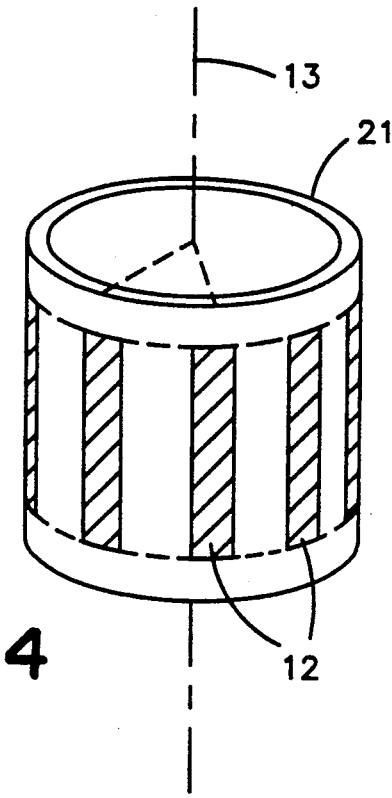
FIG. 4 is a partial, perspective, view of the casing used in the fuel supply system according to the present invention.
Figure 5:
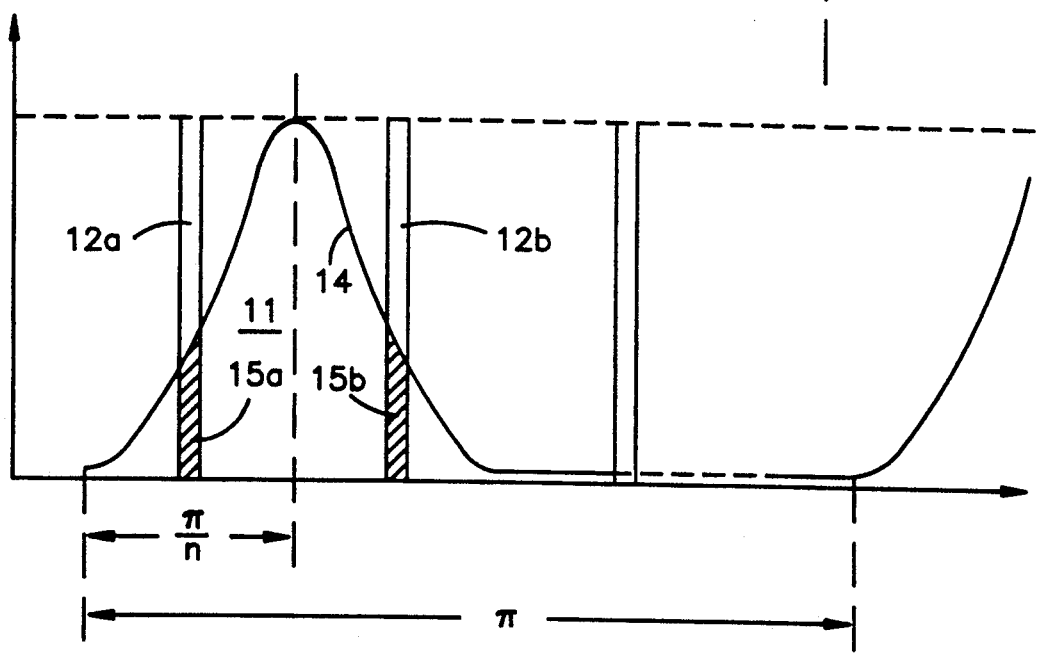
FIG. 5 is a developed view illustrating the intersection of the rotary slide valve and the casing according to the present invention.

As best illustrated in FIGS. 3-5, the first fuel distribution means 3 may incorporate a rotating slide valve 10 defining one or more apertures 11 which communicate with the fuel metering device 1 and with feed slits 12 defined in a cylindrical sleeve portion 21 inside which the slide valve 10 is mounted in a sealed manner. The slits 12 are axially elongated in a direction along the rotational axis 13 of the slide valve 10 and are circumferentially spaced apart around the circumference of the cylindrical sleeve 21. Elongated slits 12 communicate with injection manifolds 6a-6d to supply fuel to the fuel injectors 5a-5d. The aperture 11 of the rotating slide valve 10 extends angularly over a sector which substantially equals twice the circumferential space between two adjacent slits 12a and 12b. The aperture 11 is defined by a curved wall 14 so as to have a generally bell-shape which is similar to the curves C1-C4 illustrated in FIG. 2. For reasons of mechanical and hydraulic equilibrium, the rotating slide valve 10 preferably defines at least two apertures 11 on opposite sides, while sleeve 21 defines two series of four slits 12, also located on opposite sides of sleeve 21.

The opening allowing fuel to flow into any of the manifolds 6a-6d corresponds to the alignment of apertures 11 and slits 12. As illustrated in FIG. 5, each aperture 11 is of sufficient width to extend over two adjacent slits 12a and 12b, the opening through which fuel may pass being illustrated by shaded areas 15a and 15b. The shape of the aperture 11 is such that the sum of the areas 15a and 15b at any given time substantially equals the cross sectional area of a slit 12. This enables the fuel flow from the fuel metering device 1 through the first distribution means 3 to be substantially constant, thereby avoiding any pressure pulses upstream of the first fuel distribution device 3.

Figure 6:
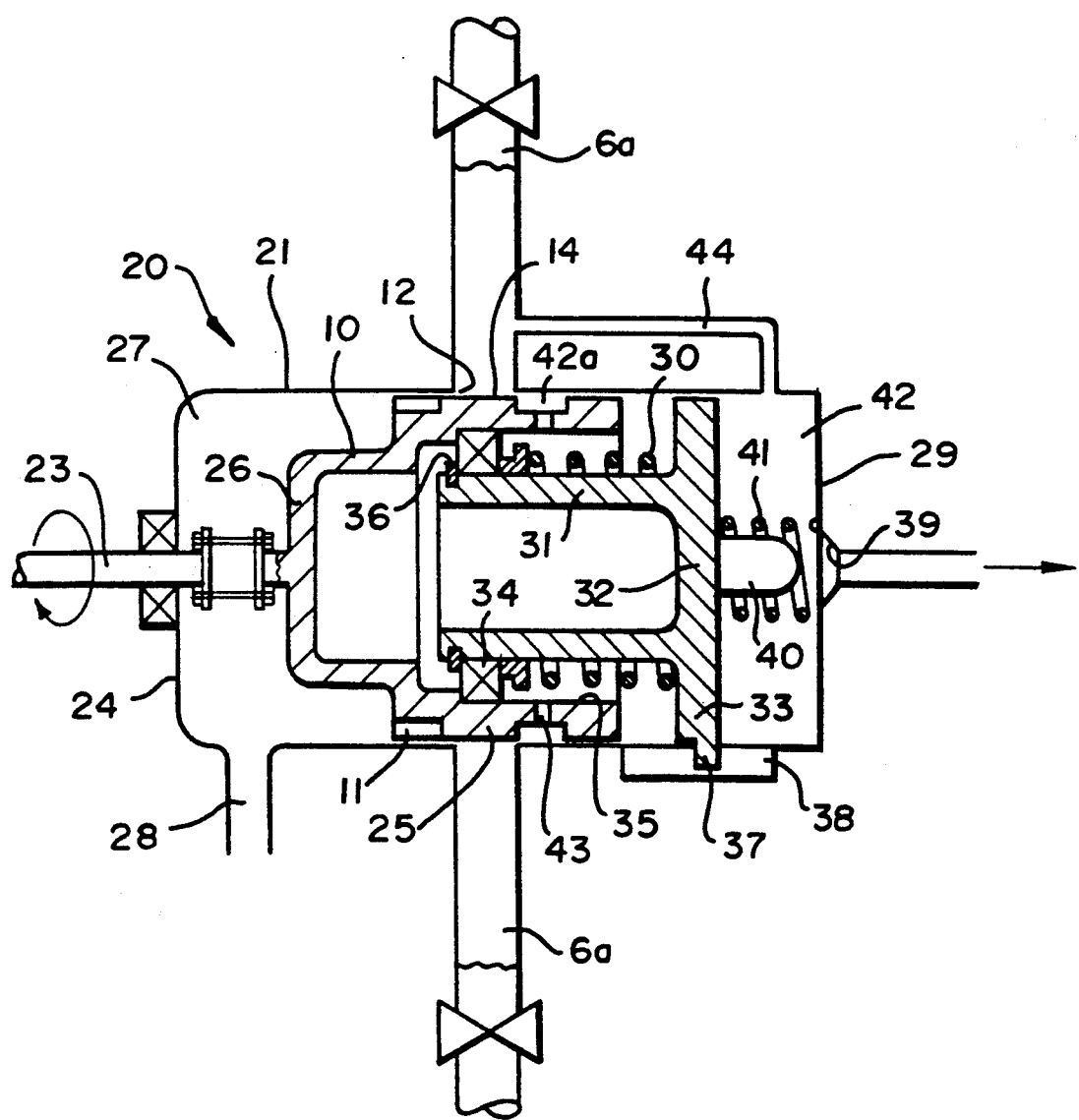
FIG. 6 is a cross sectional view of an apparatus incorporating the fuel distribution system according to the present invention.

FIG. 6 illustrates a preferred embodiment of the fuel system according to the present invention which consists of an apparatus 20 including the first fuel distribution means, the second fuel distribution means and the progressive fuel transfer device. The apparatus 20 comprises a cylindrical case 21 which receives the rotating slide valve 10 in a sealed manner such that the slide valve 10 is connected to a drive shaft 23 passing through an end wall 24 of the casing 21 so as to be rotated by a drive means (not shown). The wall of the casing 21 defines the circumferentially spaced apart slits 12 which are circumferentially displaced about the axis of rotation 13 of the slide valve 10. Fuel manifolds 6a-6d communicate with the inside of the casing 21 through the slits 12. As shown, the slits 12 have an elongated dimension and extend generally parallel to the direction of the axis of rotation 13 of the slide valve 10.

The cylindrical wall portion 25 of the slide valve 10, which is in contact with the cylindrical wall of the casing 21 defines at least one aperture 11 which communicates with the fuel inlet chamber 27 and which is defined by the curved wall 14 so as to extend across an angular sector corresponding to approximately twice the spacing between two adjacent slits 12.

Slide valve 10 has piston portion 26 which, together with the end wall 24 of the casing 21, defines a fuel inlet chamber 27 which communicates with the metering device 1 via conduit 28. As the slide valve 10 rotates during low fuel flow device 1 via conduit 28. As the slide valve 10 rotates during low fuel flow conditions, the apertures 11 sequentially open and close slits 12 thereby feeding the fuel from the fuel inlet chamber 27 to the injection manifolds 6a-6d in a cyclic manner. Under such low fuel flow conditions, the slide valve 10 is located such that the apertures 11 are axially aligned with the slits 12.

The slide valve 10 is mounted within the casing 21 such that it is able to slide in a direction parallel to its axis of rotation between a first position wherein the apertures 11 are axially aligned with the slits 12 and a second position in which the slits 12 are uncovered such that they may directly communicate with the fuel inlet chamber 27. This direction communication allows the totality of the fuel flow D to be distributed to all of the injectors 5a-5d.

Compression spring 30 is operatively interposed between an end 29 of the casing 21 and the slide valve 10 so as to bias the slide valve 10 toward its first position in which the apertures 11 are axially aligned with the slits 12. The spring means constitutes the progressive fuel transfer device that makes it possible to distribute the fuel flow D between the first and second fuel distribution means as a function of pressure exerted on the piston portion 26 of the slide valve 10, that is, as a function of the fuel flow. Preferably, the compression spring 30 extends around skirt portion 31 of piston 32 as a stop and centering means for the slide valve 10. The spring 30 is inserted between a radial wall portion 33 of the piston 32 and a bearing 34 mounted inside bore hole 35 defined by the slide valve 10. A stop 36 is attached to the free end of skirt portion 31 to prevent bearing 34, which is able to slide on the skirt portion 31, from sliding off the end of skirt portion 31. The radial wall 33 has a lug 37 extending therefrom which lug cooperates with a groove 38 formed in the cylindrical wall of the casing 21 to prevent the piston 32 from rotating within the casing 21.

The end 29 of the casing 21 defines a bleed orifice 39 which also serves as a valve seat which can be closed by end piece 40 extending from the radial wall 33 of piston 32. A second spring 41 is operatively interposed between the piston 32 and the end wall 29, the second spring 41 having a lower spring constant than that of spring 30.

Under low fuel flow conditions, the pressure exerted by the fuel in fuel inlet chamber 27 on piston portion 26 of the slide valve 10 keeps the end piece 40 against the valve seat, thereby closing off bleed orifice 39. Under zero flow conditions, the fuel pressure in the fuel inlet chamber 27 is very low such that second spring 41 moves the piston 32 and the slide valve 10 toward the left as seen in FIG. 6, so as to displace the end piece 40 from engagement with the valve seat around orifice 39. Under these zero flow conditions, the slits 12 communicate with annular groove 42a defined in the exterior wall of the slide valve 10. Orifices 43 extend through the exterior wall to allow communication between the injection manifolds 6a-6d and the bleed orifice 39, thereby enabling the fuel within the injection manifolds 6a-6d to bleed through the orifice 39 so as to return to the fuel pumps. As illustrated in FIG. 6, a conduit 44 having a small cross-section, communicates between the injection manifolds 6a-6d and the chamber 42 so as to enable the fuel to communicate with the bleed orifice 39.

The apparatus 20 operates in the following manner. When the gas turbine engine is started and when its power output is low, the fuel pressure acting on piston portion 26 moves the slide valve 10 and the piston 32 toward the side 29 of the casing 21 such that the end piece 40 engages its valve seat, thereby closing off bleed orifice 39. In this position, the apertures 11 are axially aligned with the feed slits 12. As previously explained, the rotation of the slide valve 10 enables fuel to be cyclically and sequentially delivered to the injector groups 5a-5d through the injector manifolds 6a-6d. The chamber 42 is pressurized, via the communication with the injector manifolds through conduit 44, to the same level as the pressure downstream of the apparatus 20, which is less than that of the fuel in inlet chamber 27.

For increased power outputs, the fuel pressure will rise, thereby increasing the pressure on the piston portion 26 of the slide valve 10. The increased pressure compresses the spring 30, further axially displacing the slide valve 10 toward the end 29 of the casing 21. Such axial movement causes the apertures 11 to at least partly retract from alignment with the slits 12, thereby increasing the cross-sectional area of the slits 12 used to feed the injectors 5. The levels of engine performance at which the switching takes place is, of course, variable, and is selected in relation to the specific performance parameters of each particular engine.

Conversely, when the engine power decreases, the slide valve 10 will again move towards its first position due to the decrease of the fuel pressure on the piston portion 26 and the biasing force of spring 30. Again, rotation of the slide valve 10 will impart a cyclic feed of fuel to the injectors 5a-5d for the low-power mode of operation. When the fuel supply is completely shut off, the second spring 41 displaces the piston 32 towards the left, as seen in FIG. 6, thereby allowing the bleeding of fuel from manifolds 6a-6d through the orifice 39.

In order to ensure adequate accuracy of the fuel distribution for the low flow operating mode, the number of slits 12 must at least be equal to the number of apertures 11. In a preferred embodiment, the number of slits 12 is at least twice that of the number of apertures 11.

In this manner, all of the injector groups are fed sequentially and there is minimal fuel flow fluctuation due to the rotation of the feed slide valve 10. The fuel feed distribution accuracy to the different groups of fuel injectors at the low flow operating mode is achieved by the geometric arrangement of the apertures 11 and the slits 12. One of the advantages of the fuel feed system according to this invention, results from the small cross-section of the passageways required to feed the fuel. Such small passageways are easily formed by the configuration of apertures 11 and slits 12, which may be easily machined with minimal tolerances. This results in the low dimensional accuracy required expressed as a percentage of the cross-section. The operation of feed slide valve 10 allows averaging the errors of all of the apertures 11 by each slit 12 for each group of fuel injectors, thereby ensuring an optimization of low-flow distribution accuracy.

The foregoing description is provided for illustrative purposes only and should not be construed as in any way limiting this invention, the scope of which is defined solely by the appended claims.

We claim:

1. A system for supplying fuel to a plurality of fuel injectors of a gas turbine engine wherein the fuel injectors are interconnected into a plurality of groups of fuel injectors, the system including a source of fuel and comprising:
   a) first fuel distribution means operatively associated with the plurality of fuel injectors so as to sequentially supply fuel to each of the plurality of groups of fuel injectors when the fuel flow is below a predetermined threshold value such that the flow rate from the fuel source is generally constant, wherein the fuel distribution means comprises:
      i) a generally cylindrical casing having a central axis and defining a plurality of axially elongated slits circumferentially spaced apart around the casing, and further defining a fuel inlet chamber;
      ii) a generally cylindrical feed slide valve located in the generally cylindrical casing, the feed slide valve defining at least one aperture communicating with the fuel inlet chamber;
      iii) conduit means operatively connecting each slit to a group of fuel injectors; and,
      iv) rotating means to rotate the feed slide valve about a rotational axis relative to the casing such that, as the slide valve rotates, the at least one aperture is sequentially in communication alignment with the plurality of slits so as to allow fuel to pass from the fuel inlet chamber into the conduit means;
   b) second fuel distribution means operatively associated with the plurality of fuel injectors so as to supply fuel to all of the plurality of fuel injectors when the fuel flow exceeds a predetermined threshold value; and,
   c) fuel transfer means operatively associated with the first and second fuel distribution means so as to direct fuel from the fuel source to the first and second fuel distribution means as a function of the fuel flow.

2. The system of claim 1 wherein the first fuel distribution means simultaneously supplies fuel to two groups of fuel injectors.

3. The system of claim 1 wherein the at least one aperture has a maximum width equal to approximately twice the space between adjacent slits.

4. The system of claim 3 wherein the at least one apertures is bounded by a generally bell-shaped curved wall.

5. The fuel system of claim 1 wherein the slide valve is axially movable between a first position in which the at least one aperture is axially aligned with the plurality of slits and a second position in which the slide valve is axially displaced from the slits such that the plurality of slits are all uncovered.

6. The system of claim 5 wherein the second fuel distribution means comprises piston means operatively associated with the slide valve and defining a portion of the fuel inlet chamber such that fuel in the fuel inlet chamber acts on the piston to move the slide valve axially along its rotational axis toward its second position.

7. The system of claim 6 wherein the fuel transfer means comprises biasing means operatively associated with the slide valve so as to bias the slide valve toward its first position.

8. The system of claim 7 wherein the biasing means comprises resilient spring means.

9. the system of claim 8 wherein the resilient spring means comprises a first spring acting on the slide valve so as to bias the slide valve toward the first position.

10. The system of claim 9 further comprising:
a) a second piston slidably located in the casing locating such that the first spring is operatively interposed between the second piston and the slide valve; and,
b) second spring means operatively interposed between the second piston and the casing.

11. The system of claim 10 further comprising:
a) a fuel return opening defined by the casing; and,
b) an end piece extending from the second piston such that the end piece plugs the fuel return opening as the slide valve moves towards its second position.

12. The system of claim 1 wherein the number of slits is at least equal to the number of apertures.

13. The system of claim 1 wherein the number of slits is equal to at least twice the number of apertures.

* * * * *